March 21, 1944.   E. JACOBS   2,344,819
INVOICE FORM AND METHOD OF INVOICING
Filed Sept. 9, 1941   9 Sheets-Sheet 1

INVENTOR
EDWARD JACOBS
BY
Caesar and Rivise
ATTORNEYS

March 21, 1944.　　　　E. JACOBS　　　　2,344,819
INVOICE FORM AND METHOD OF INVOICING
Filed Sept. 9, 1941　　　9 Sheets-Sheet 2

INVENTOR
EDWARD JACOBS
BY
Caesar and Rivise
ATTORNEYS

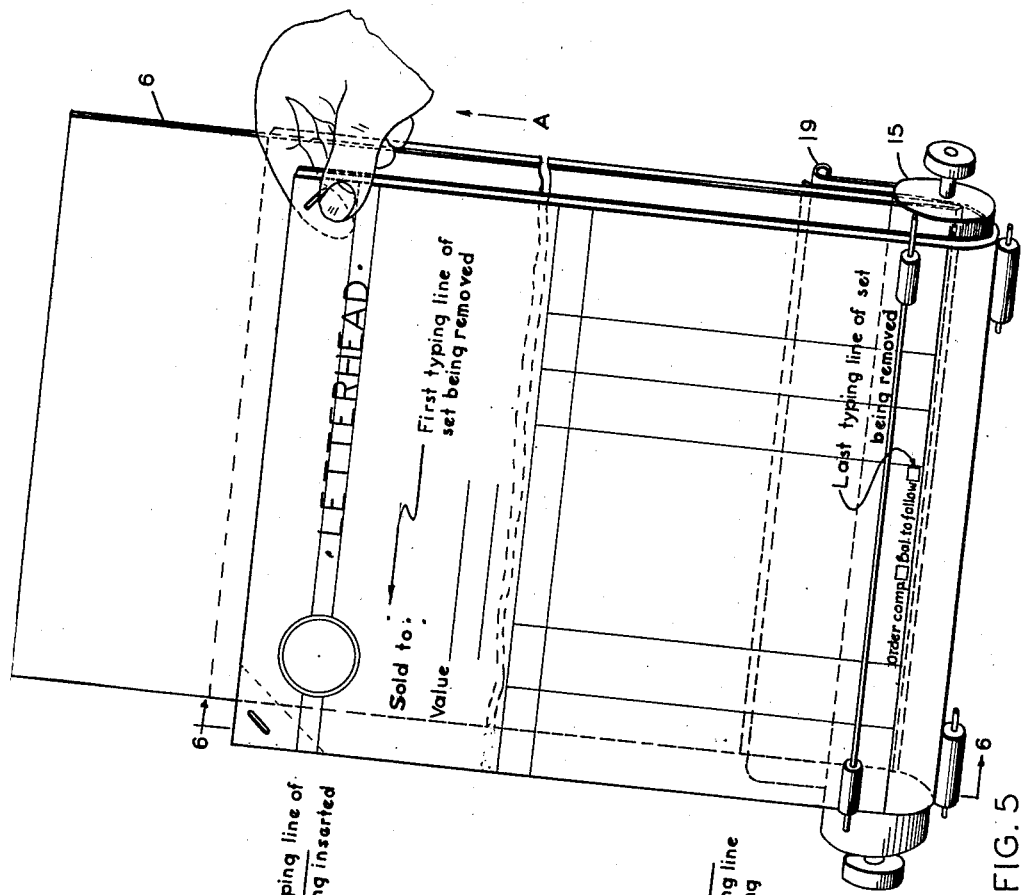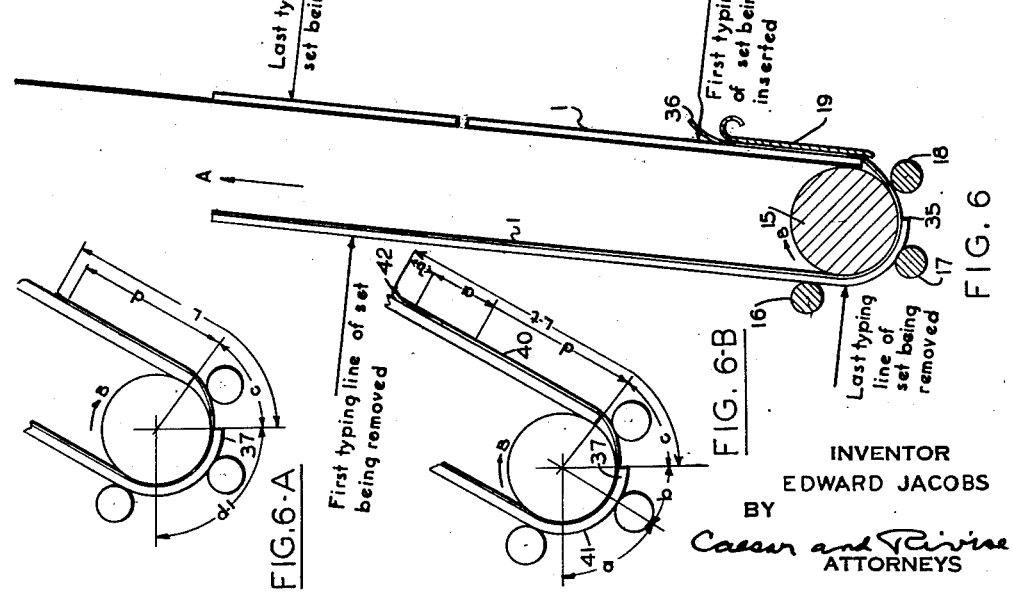

March 21, 1944.  E. JACOBS  2,344,819
INVOICE FORM AND METHOD OF INVOICING
Filed Sept. 9, 1941  9 Sheets-Sheet 4
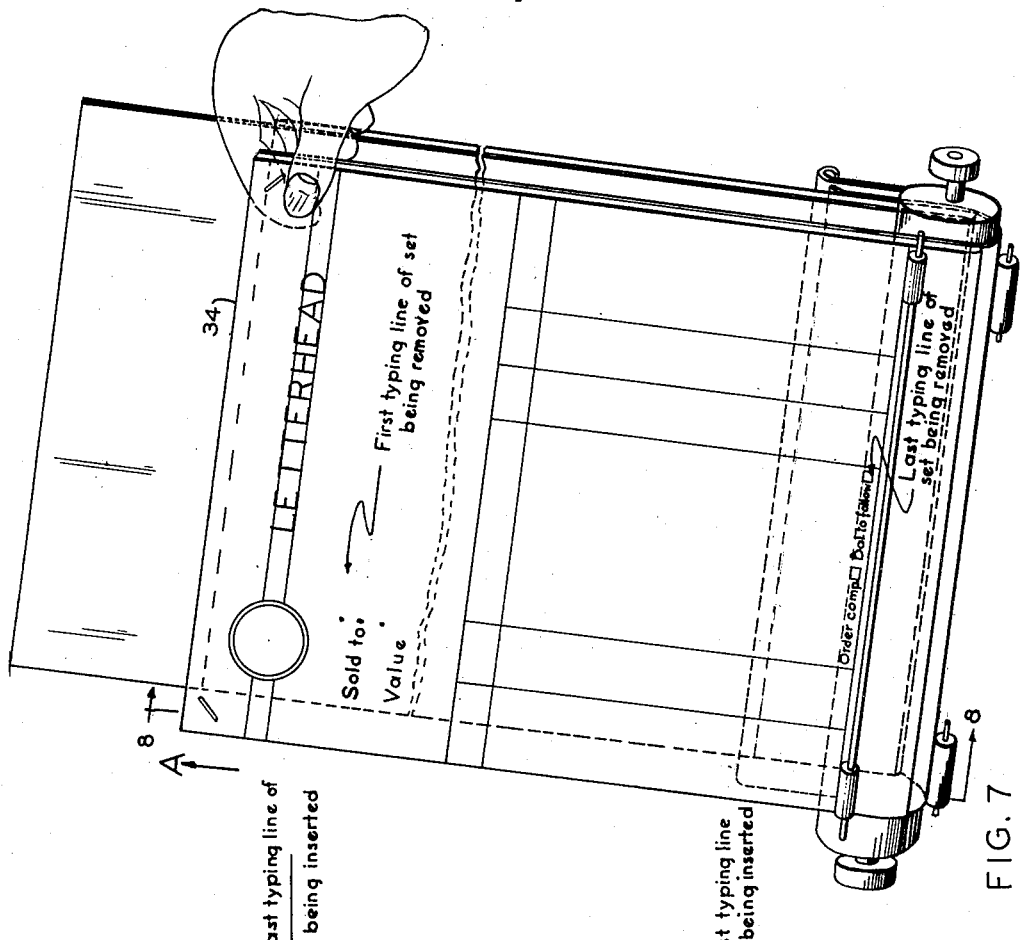
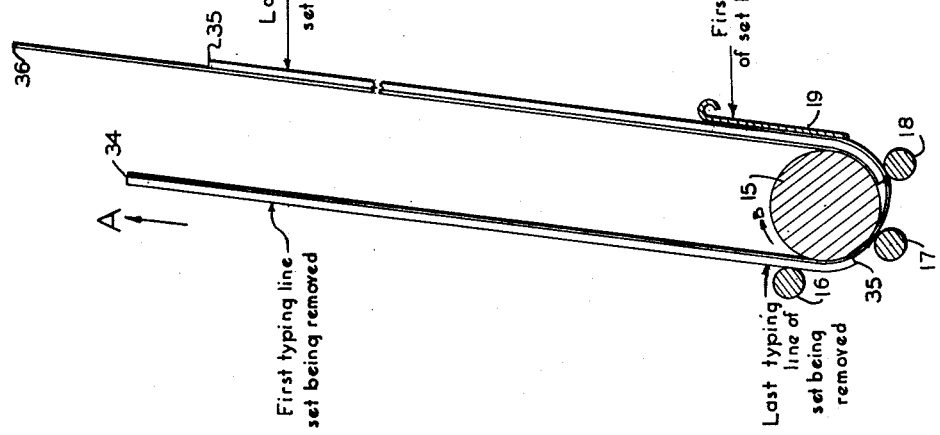
INVENTOR
EDWARD JACOBS
BY
Caesar and Rivise
ATTORNEYS March 21, 1944.   E. JACOBS   2,344,819
INVOICE FORM AND METHOD OF INVOICING
Filed Sept. 9, 1941   9 Sheets-Sheet 5
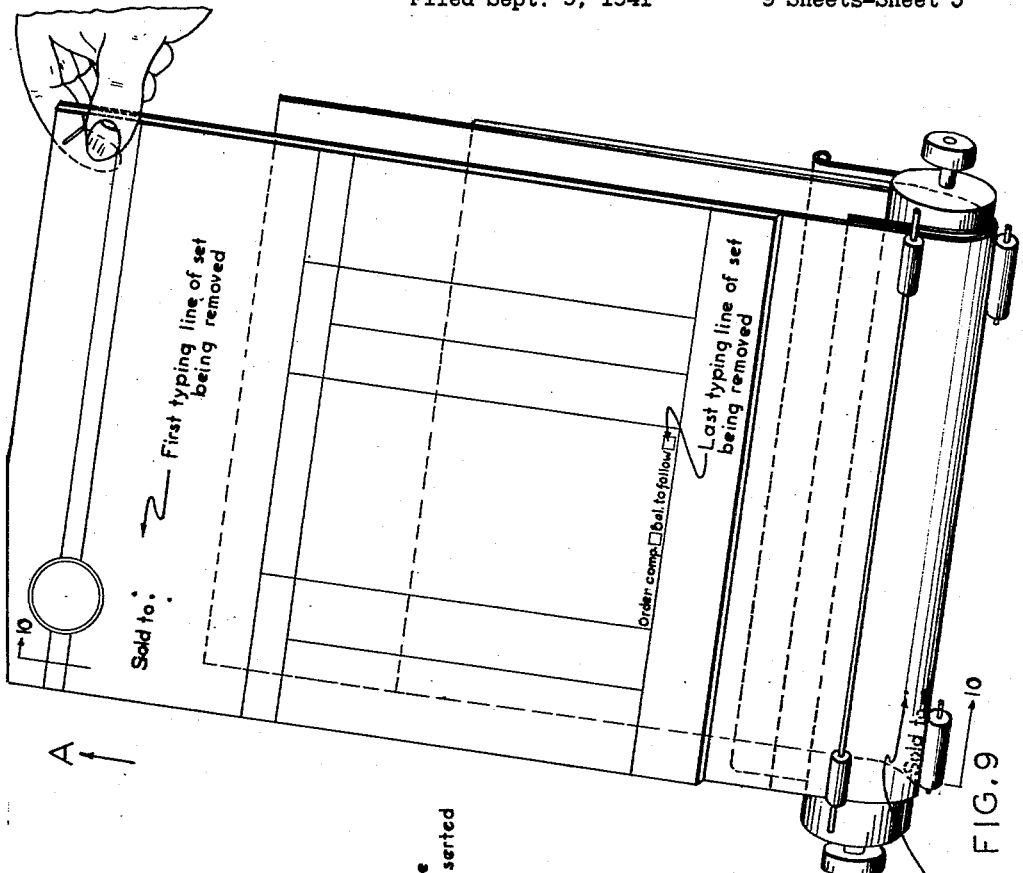
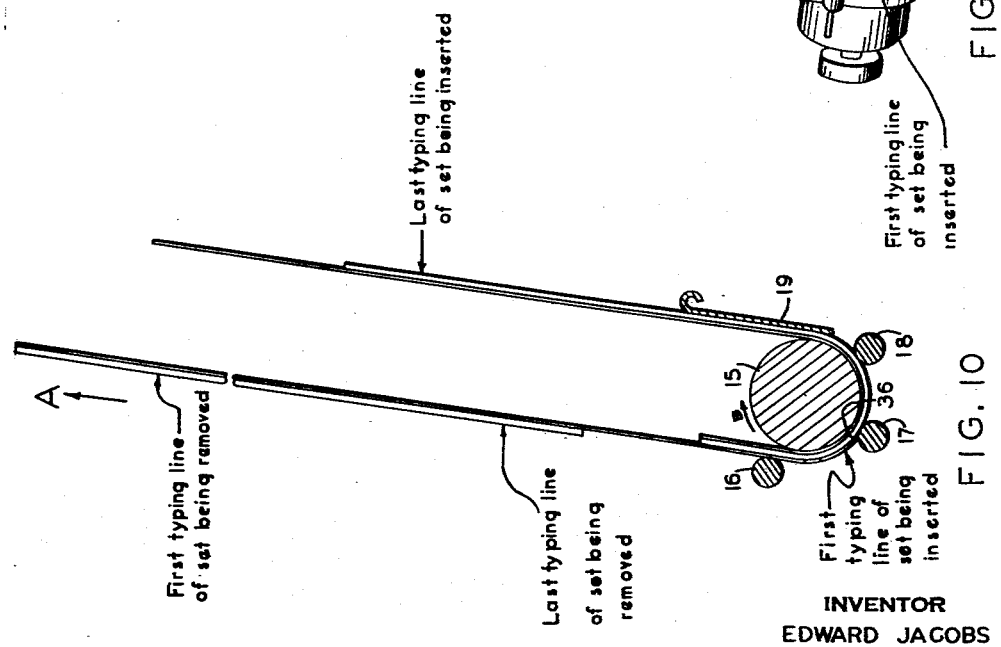
INVENTOR
EDWARD JACOBS
BY
Caesar and Revise
ATTORNEYS March 21, 1944.  E. JACOBS  2,344,819
INVOICE FORM AND METHOD OF INVOICING
Filed Sept. 9, 1941  9 Sheets-Sheet 6
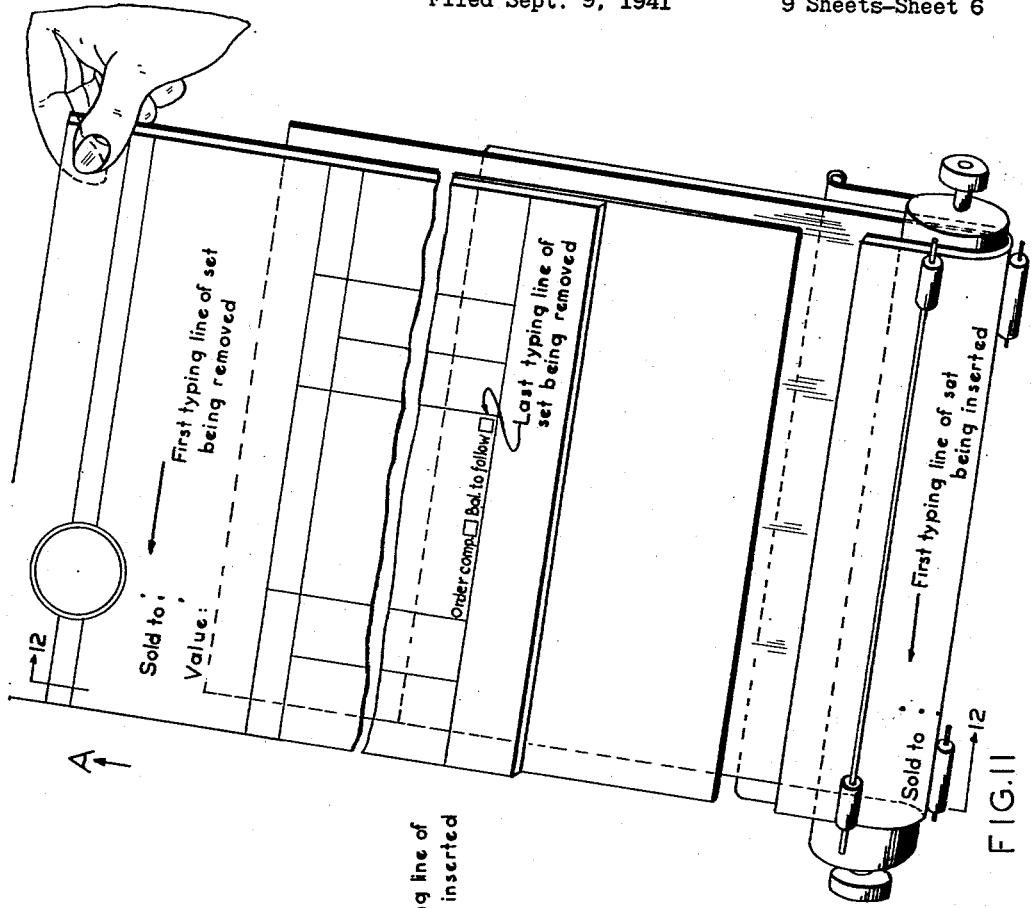
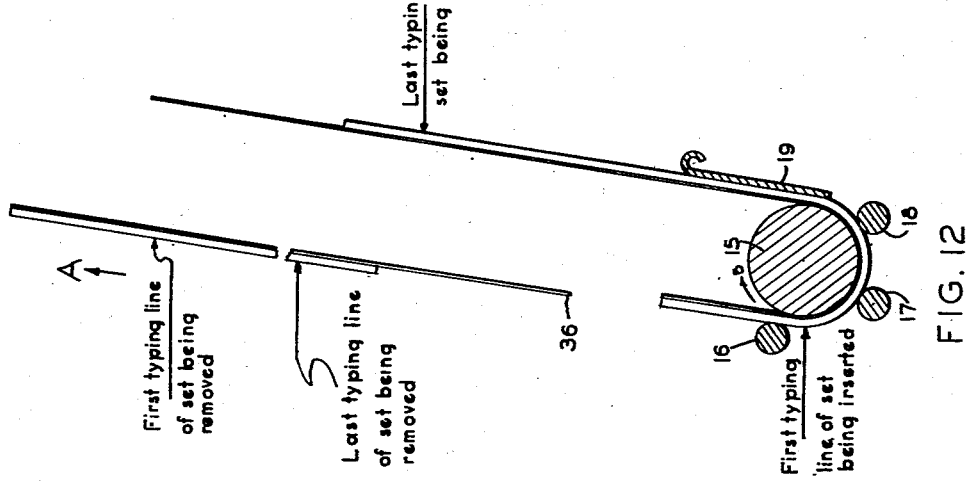
INVENTOR
EDWARD JACOBS
BY Caesar and Rivise
ATTORNEYS March 21, 1944.   E. JACOBS   2,344,819
INVOICE FORM AND METHOD OF INVOICING
Filed Sept. 9, 1941   9 Sheets-Sheet 7

INVENTOR
EDWARD JACOBS
BY
Caesar and Rivise
ATTORNEYS

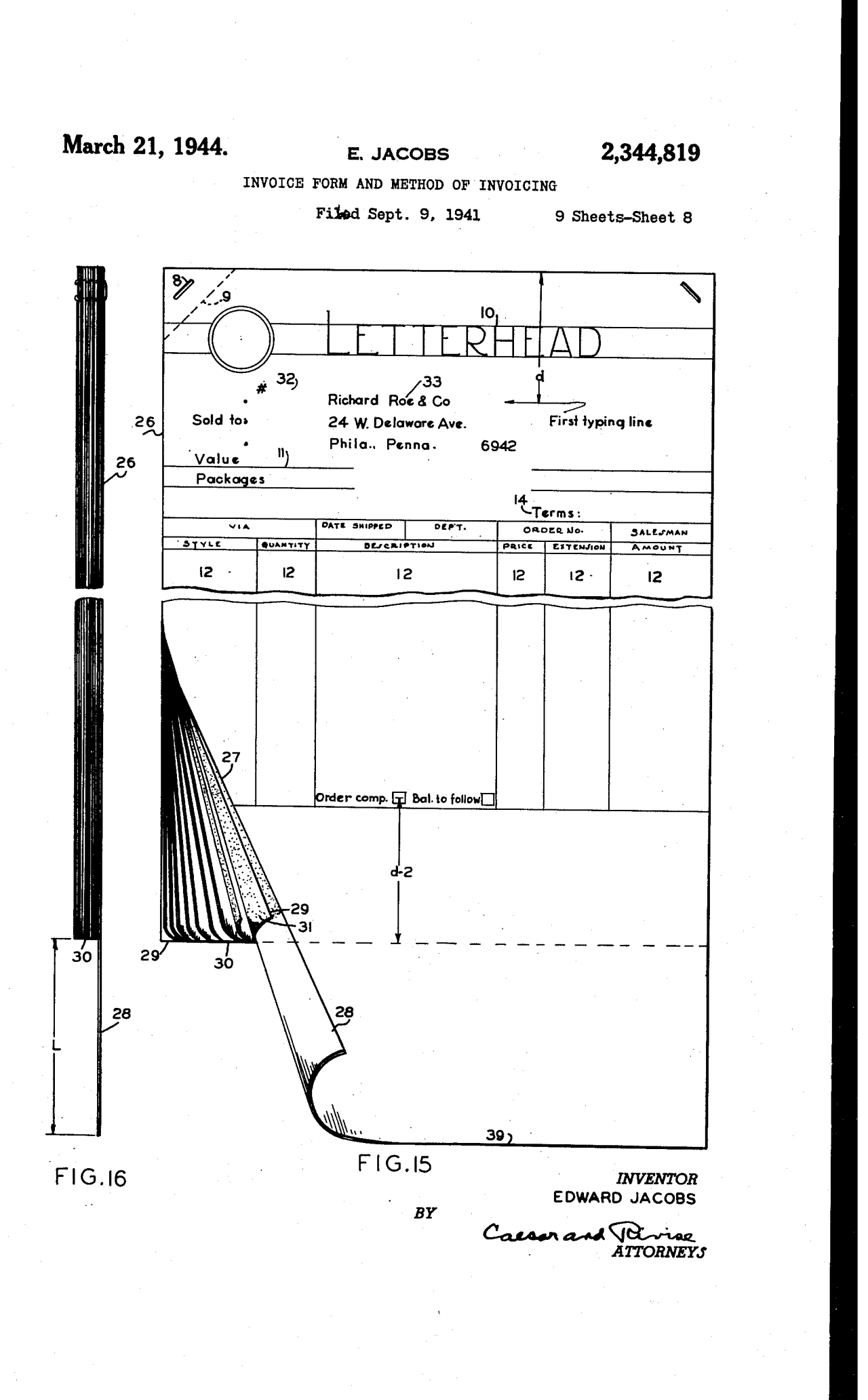

March 21, 1944.     E. JACOBS     2,344,819
INVOICE FORM AND METHOD OF INVOICING
Filed Sept. 9, 1941     9 Sheets-Sheet 8

FIG.16     FIG.15

*INVENTOR*
EDWARD JACOBS
BY
Caesar and Rivise
*ATTORNEYS*

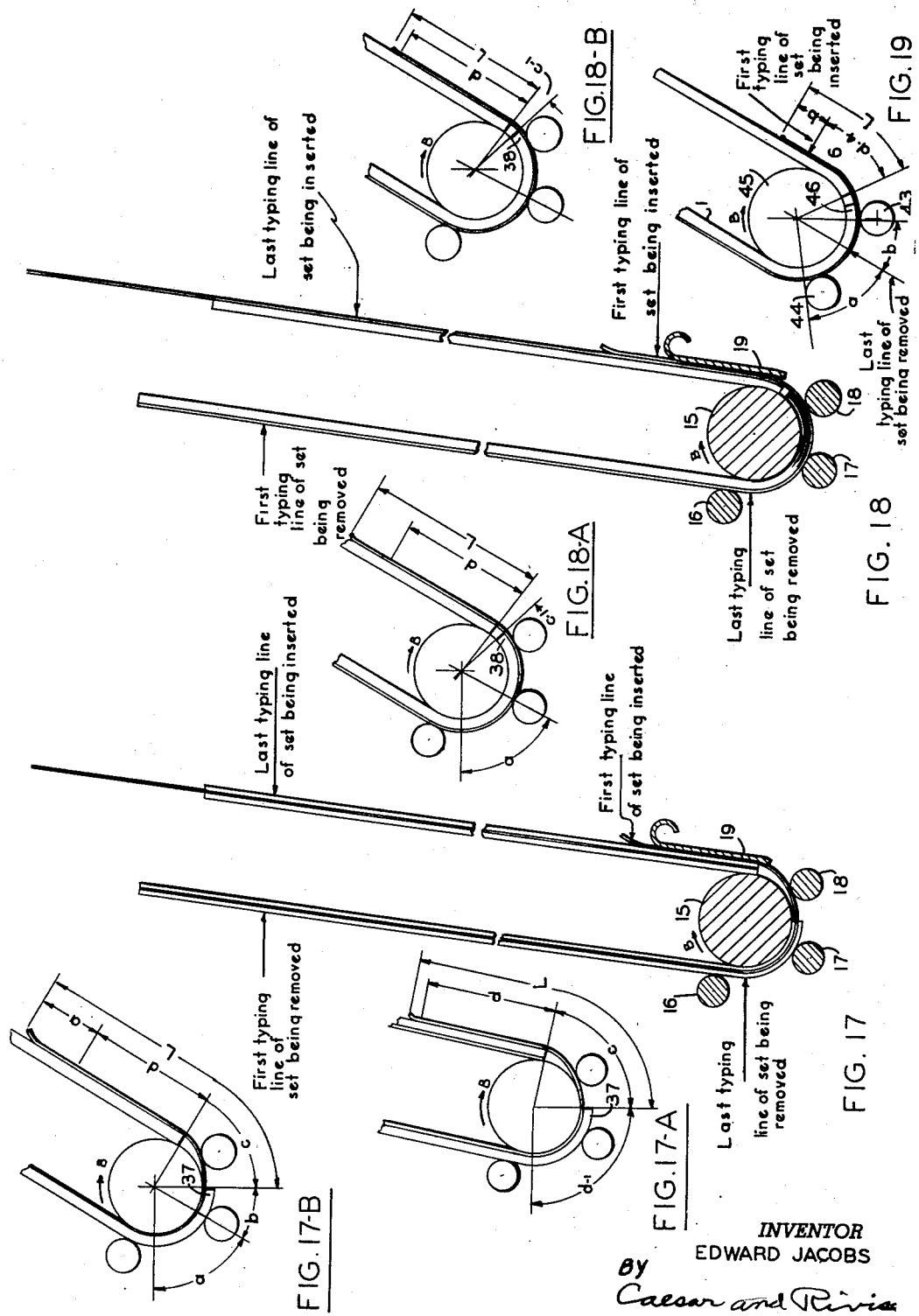

Patented Mar. 21, 1944

2,344,819

UNITED STATES PATENT OFFICE 2,344,819

INVOICE FORM AND METHOD OF INVOICING

Edward Jacobs, Philadelphia, Pa.

Application September 9, 1941, Serial No. 410,195

12 Claims. (Cl. 282—22)

This invention relates to invoice sheets and has as its object the production of a new and improved set of invoice sheets.

Modern business practice generally necessitates the use of multiple copies of the invoice sheet for any particular shipment. The determining factor as to the invoice sheets used in any particular case depends upon the ultimate cost. The ultimate cost in any particular case is the sum of the cost of the invoice sheets, the value of time consumed by the operator who inserts the desired data upon said sheets, and the cost of any special apparatus or attachments used. The time consumed by the operator who inserts the necessary data upon the invoice sheets depends upon the ease with which they can be inserted in the machine, their flexibility in the machine, the amount of data which may be pre-printed upon the sheets, and the ease with which the sheets may be separated after the desired data has been typed in.

Among the invoice sheets now in use are individual sets interleaved with one time carbon and various types of continuous forms including the continuous form with one time carbon. The continuous forms can be handled faster than the individual sets interleaved with one time carbon. This is particularly true of the continuous form with one time carbon. But the sheets in the individual sets interleaved with one time carbon can be made in different lengths, whereas continuous forms cannot, are less expensive to make than the continuous forms, and can be used in connection with any typewriter, whereas at least some special attachment to a typewriter is always necessary to adapt it for use with continuous forms. In addition, it is much less expensive to interchangeably handle different types of pre-printed invoices of the individual set interleaved with one time carbon type than the continuous form type. It is an object of this invention to produce invoice sheets of the individual set one time carbon type which will have all of the speed of the continuous form type and still retain all of the advantages of the individual set one time carbon type.

Another of the objects of my invention is to produce a set of invoice sheets which will be cheaper to make than the continuous one time carbon type, which can be handled with the same speed as the continuous one time carbon type, in which one can use sheets of varying lengths in the set, which can be of different lengths as sets and have different data pre-printed thereon and can still be readily fed into the machine without making any adjustments of the machine, which do not require any special attachments to the machine in connection with which are are to be used, and on which any additional information can be added on any spot after the original typing of the invoice.

The above as well as other objects are each attained by me by forming individual sets of invoice sheets with one time carbon and providing the lower end of one of said sheets with a tail of such length that it will carry the top edge of the succeeding set of invoice sheets from their lowermost non-inserted position to a point where said top edge is at least under the top edge retaining rollers of the machine in connection with which said set of invoice sheets is being used. In the preferred embodiment, the tail is of such length that it carries the set of sheets being inserted to substantially the "first typing position."

For the purpose of illustrating the invention with the particularity required by law, I have shown in the drawings which form a part hereof and will now describe some of the many embodiments of my novel concept.

In said drawings, Figure 1 is a group of invoice sheets made in accordance with my invention. One corner of each of the sheets in the set has been curled upwardly for greater clearness of illustration. For the same reason the thickness of each sheet in the set has been exaggerated with respect to the other dimensions in this figure as well as in Figures 3 to 19 inclusive. A portion of each of the sheets in the unit has been broken away intermediate its ends in order to permit the showing of the remaining parts on as large a scale as possible.

Figure 2 is a side view of the group of invoice sheets shown in Figure 1.

Figure 3 is a perspective view showing the group of invoice sheets in a typewriter. The set is shown a few lines above the "first typing position" for greater clearness. (Note: The scale is smaller than that used in Figures 1 and 2.) A portion of the typewriter, a portion of the set of invoice sheets intermediate its ends, and a corner of the lowermost invoice sheet in the set has been broken away in order to permit the showing of the remaining parts on as large a scale as possible.

Figure 4 is a section of a fragment of the set of invoice sheets and of the typewriter platen taken along the line 4—4 of Figure 3 with the set in the "first typing position." (Note: The set of invoice sheets are not shown in section either in this figure or in Figures 6, 8, 10, 12, 17, 18 and 19, since it is believed that "sectioning" of the sheets would tend to obscure the novel structural elements of the set of sheets.)

Figure 5 is a perspective view of the typewriter platen with one set of invoice sheets in the "last typing position" and another set of sheets in the "feeding position." The first set of sheets is being held between the thumb and forefinger of the operator who is about to begin pulling the set in the direction of the arrow A for the purpose of removing said set from the typewriter and automatically pulling the second set of sheets into substantially the "first typing position." (Note: The scale used for Figures 5 to 12 inclusive is smaller than that used in Figures 1 and 2.)

Figure 6 is a section taken along the line 6—6 of Figure 5. A portion of the second set has been torn away intermediate its ends in order to permit the showing of the remaining parts on as large a scale as possible.

Figure 6A is a view of a fragment of Figure 6, including the typewriter platen provided with indicia relating to the length of the tail of the sets of invoice sheets shown in Figures 5 and 6.

Figure 6B is a view taken similarly to Figure 6A, but showing sets of invoice sheets which are provided with a longer tail than that shown in Figures 5 and 6.

Figure 7 is a perspective view of the typewriter platen with the two sets of sheets advanced from the position which they occupied in Figures 5 and 6 by the operator who is still holding the first set of sheets between his thumb and forefinger and pulling in the direction of the arrow A. A portion of the set of invoice sheets being inserted has been broken away intermediate its ends for the purpose of showing the remaining parts on as large a scale as possible.

Figure 8 is a section taken on the line 8—8 of Figure 7. A portion of the second set of invoice sheets has been torn away intermediate its ends in order to permit the showing of the remaining parts on as large a scale as possible.

Figure 9 is a perspective view of the typewriter platen with the two sets of invoice sheets advanced from the position shown in Figures 7 and 8 by the operator who is still holding the first set and pulling the same in the direction of the arrow A. A corner of one of the sheets of this set has been broken away in order to show the remaining parts on as large a scale as possible.

Figure 10 is a section taken on the line 10—10 of Figure 9. A portion of the set of sheets being removed has been torn away intermediate its ends in order to permit the showing of the remaining parts on as large a scale as possible.

Figure 11 is a perspective view of the typewriter platen with the two sets of invoice sheets advanced from the position shown in Figures 9 and 10 by the operator who has now completed pulling the first set of sheets upwardly. The first set of sheets has been entirely removed from the roller, and the second set of sheets has now reached the "first typing position." A portion of the first set of sheets has been torn away intermediate its ends in order to show the remaining parts on as large a scale as possible.

Figure 12 is a section along the line 12—12 of Figure 11. (Note: Figures 5 to 12 inclusive are all drawn to the same scale.)

Figures 1, 2:
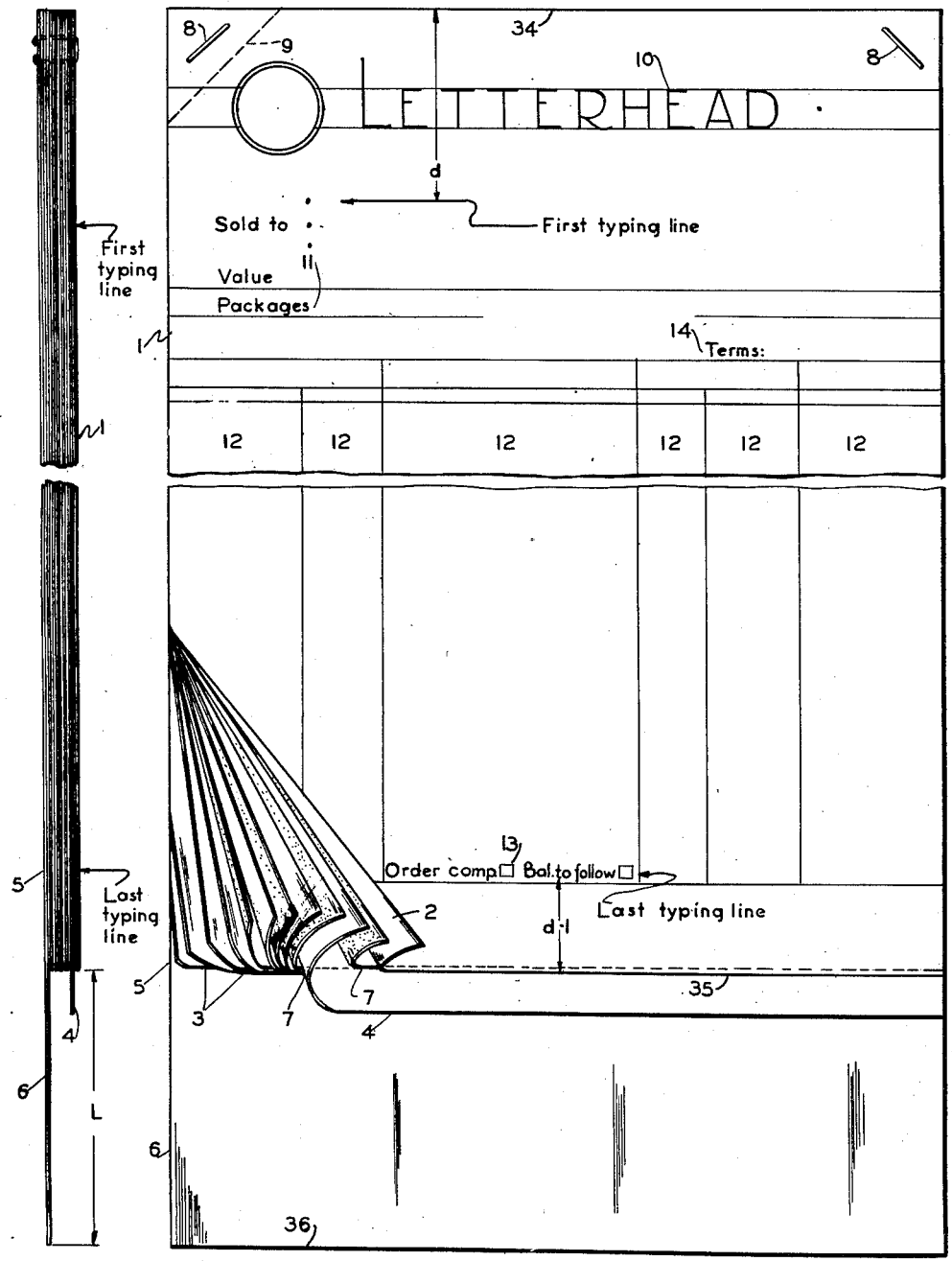
Figure 3:
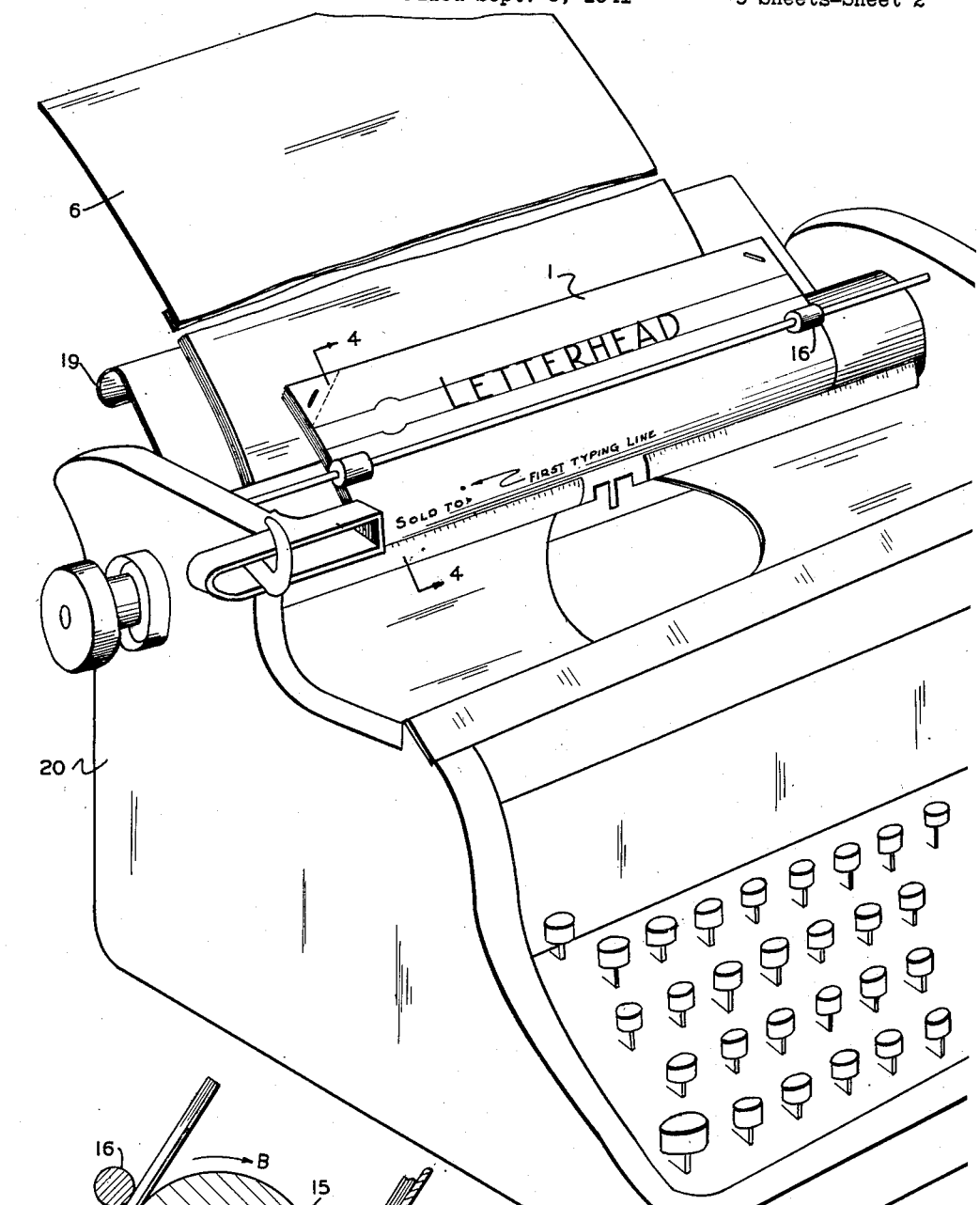
Figure 4:
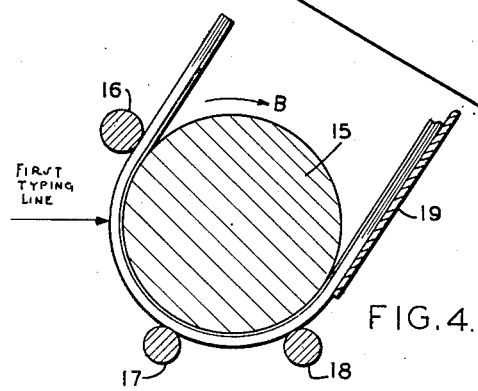
Figures 13, 14:
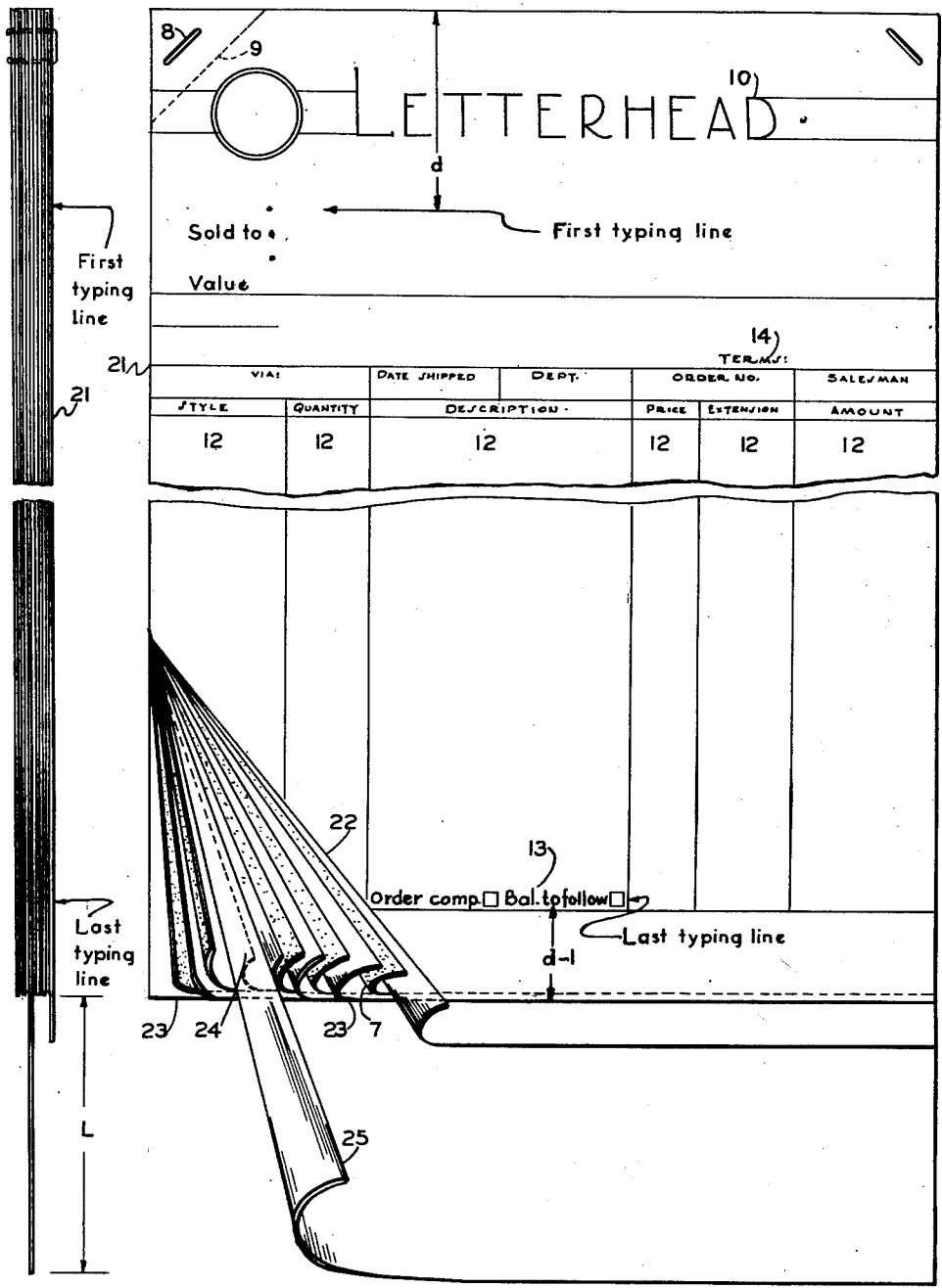

Figure 13 is a plan view of a modification of my invention drawn on the same scale as Figure 1. A portion of the set has been torn away intermediate its ends in order to show the remaining parts on as large a scale as possible.

Figure 14 is a side view of the set of invoice sheets shown in Figure 13.

Figure 15 is a plan view of still another modification of my invention drawn on the same scale as Figure 1. A portion of the set has been torn away intermediate its ends in order to show the remaining parts on as large a scale as possible.

Figure 16 is a side view of the set of invoice sheets shown in Figure 15.

Figure 17 is a view taken similarly to and on the same scale as Figure 6, wherein two sets of invoice sheets such as are shown in Figures 13 and 14 are used. Both sets of invoice sheets have been broken away intermediate their respective ends in order to permit the showing of the remaining parts on as large a scale as possible.

Figure 17A is a view of a fragment of Figure 17, including the typewriter platen provided with indicia relating to the length of the tail shown in Figure 17.

Figure 17B is a view taken similarly to Figure 17A, but showing sets of invoice sheets which are provided with a longer tail than that shown in Figure 17.

Figure 18 is a view taken similarly to and on the same scale as Figure 6, wherein two sets of invoice sheets such as are shown in Figures 15 and 16 are used. Both sets of sheets have been broken away intermediate their respective ends in order to permit the showing of the remaining parts on as large a scale as possible.

Figure 18A is a view of a fragment of Figure 18, including the typewriter platen provided with indicia relating to the length of the tail shown in Figure 18.

Figure 18B is a view taken similarly to Figure 18A, but showing sets of invoice sheets which are provided with a shorter tail than that shown in Figure 18.

Figure 19 is a view taken similarly to Figure 18A, but wherein a "Burroughs billing machine" platen has been substituted for the typewriter platen shown in Figure 18A.

Referring more particularly to the drawings, wherein similar reference numerals denote similar parts, reference numeral 1 designates the set of invoice sheets shown in Figures 1 to 12 as a unit. This set of invoice sheets is composed of a top invoice sheet 2, a plurality of intermediate invoice sheets 3 all of the same size as the top sheet 2, an intermediate invoice sheet 4 somewhat longer than the sheets 2 and 3 in order that it may be readily distinguished from them, a bottom invoice sheet 5 which terminates in a long tail piece 6, and a plurality of carbon sheets 7. One carbon sheet 7 is positioned between each of two adjacent invoice sheets in the usual manner. The various sheets are bound together as a unit in any convenient manner as by the staples 8. The invoice sheets 2, 3, 4, and 5 have a line of scoring 9 formed therein near one of the ends thereof to facilitate the separation and removal of the invoice sheets in the set or unit. Each of the sheets 2, 3, 4, and 5 has imprinted thereon a caption or heading 10, a plurality of properly designated spaces 11, columns 12, and blocks 13 for the insertion of desired data, and such other data 14 as the user of the invoice sheet desires. For the purpose of ready identification the first space 11 into which data is to be inserted is designated as the "first typing line" and the last space 11, last line of the columns 12, or last block 13 into which data is to be inserted is designated as the "last typing line."

The tail piece 6 of each set 1 of invoice sheets must be long enough to carry the set which is to follow it from the lowermost non-inserted position of the top edge 34 of the set being inserted to a position where said top edge 34 is at least under the upper sheet retaining rollers or means 16 of the typewriter 20.

Further, in the preferred embodiment of my invention a definite relationship exists between the "first typing line," the "last typing line," and the tail piece 6. In said embodiment, the first and last typing lines are so positioned and the length of the tail piece is such that the tail piece of the set being removed from the typewriter will carry the set being inserted from the lowermost non-inserted position (shown in Figures 5 and 6), under the upper sheet retaining rollers 16, and to substantially the "first typing position" (shown in Figures 11 and 12), while the set being removed travels from the "last typing position" (shown in Figures 5 and 6) to a point where the lowermost edge 36 of the tail piece 6 clears the front lower sheet retaining rollers or means 17 (shown in Figures 9 and 10). The length of the tail necessary to achieve this result can be varied between certain limits, depending upon whether the operator will merely rotate the platen 15 slowly in going from the position in Figures 5 and 6 to that in Figures 9 and 10, or whether he will pull the set of sheets being removed rapidly in the direction of the arrow A. The more rapid the pull in the direction of the arrow A the shorter the tail. This feature is illustrated in Figures 6A and 6B.

The theoretical length $L-t$ of the tail 40 necessary to carry the set of invoices being inserted from the lowest non-inserted position (such as shown in Figures 5 and 6) to the "first typing position" is shown in Figure 6B. This length is equal to $a+b+c+d$ measured along the outer face 41 of the invoice sheets in the position shown in Figure 6B. It is to be noted that $a+b$ is the distance of the "last typing line" from the lowermost edge of the top invoice sheet, and that $d$ is the distance of the "first typing line" from the uppermost edge of the set of sheets. When the tail 40 is of this length and the operator turns the platen with his hand in the direction of the arrow B, said tail will carry the set being inserted from its lowest non-inserted position (such as shown in Figures 5 and 6) to its "first typing position" while the set being removed travels from a position such as is shown in Figures 5 and 6 to such as that shown in Figure 10, where the lowermost edge 42 of the tail 40 is just leaving the front lower sheet retaining rollers 17.

In practice, the length of the tail may be made shorter than the length $L-t$ of the tail 40. This is because the operator usually removes the set which has been finished by pulling the same in the direction of the arrow A. As a result, a certain amount of momentum is imparted to the platen 15 in the course of the upward pull. This momentum carries the platen 15 and the set of sheets being inserted from a position such as shown in Figures 9 and 10 to that shown in Figures 11 and 12 after the lowermost edge of the tail leaves the lower front sheet retaining rollers. The set of sheets shown in Figures 1, 2, and 6A has a tail 6 designed to meet this condition when used in connection with any one of the standard typewriters now in use, and the operator exerts an average pull in the direction of the arrow A upon the set of sheets which are being removed from the machine. It will be noted that the length L of the tail 6 is substantially equal to $c+d$. It is to be noted that the distance $d$ is the distance from the uppermost edge 34 of the set of sheets to the "first typing line."

The distance $d$ depends upon the subject matter which precedes it, including the caption 10. This is entirely a matter of choice or selection, depending upon the needs or desires of the user of the invoice sheets. The distance $d-1$, that is the distance of the "last typing line" from the lowermost edge 35 of the regular size invoice sheets, such as 2 and 3, depends upon the diameter of the platen of the machine in which the set of invoices will be typed and the distance of front lower sheet retaining rollers 17 from the typing line, or the diameter of said platen and the distance of the rear lower sheet retaining rollers or means 18 from the typing line. One uses the distance from the typing line to the front lower sheet retaining rollers in cases such as shown in Figures 1 to 14 where the unit is of such length that the lower edge 35 of the sheets 2 and 3 of the unit 1 fall at the point 37 just a little beyond the front lower sheet retaining rollers when the unit in the machine is in the "last typing line" position as shown in Figures 5 and 6. The units 1 (Figures 1 to 12) and 21 (Figures 13, 14, and 17) are designed in this manner. One uses the distance from the typing line to the rear lower sheet retaining rollers when the lower edge 30 of the sheets 29 or their equivalents fall at the point 38 just a little beyond the rear lower sheet retaining rollers 18 when the unit in the machine is in the "last typing line" position as shown in Figure 18. The unit 26 shown in Figures 15, 16, and 18 has been designed in this manner. Whether one use a unit such as 1 and 21, or a unit such as 26, depends upon the amount of gripping power one desires to have upon the unit which is being typed when it is in the "last typing line position." I have found that for all practical purposes a unit such as 1 and 21 is held satisfactorily. Therefore, that is my preferred embodiment since it saves paper.

The spacing of the retaining rollers is practically the same for all standard typewriting machines. Where the spacing of these rollers is changed, it will then be necessary to vary the theoretical length of the tail to conform with the conditions imposed by the changed spacing of the rollers. But in all cases the length of the tail will be determined in the manner set forth in the discussion of Figures 6A and 6B. This is illustrated in Figure 19, where the platen and sheet retaining rollers are those of a billing machine, where only two sheet retaining rollers are used, and their spacing is somewhat different than that shown in Figures 6A and 6B. The length L of the tail of the sets of invoice sheets shown in Figure 19 is equal to the distance $d-4+b$, where $d-4$ is the distance from the set top to the "first typing line," and $b$ is the distance from the "last typing line" to the sheet retaining roller 43.

I have found that as a practical matter, the length of tail for sheets which are designed to be inserted into a "Burroughs billing machine" by turning the platen can also be used for sets of invoice sheets which are to be used in connection with typewriters now in general use.

Although the manner of using my device is believed to be obvious from the foregoing disclosure, yet to obviate any possible misunderstanding, the following detailed description is here given:

The operator positions in the usual manner a group of invoice sheets 1 in the machine in which he will type the invoices and types all of the necessary entries in the usual manner. In due course, he reaches the "last typing position," shown in Figures 5 and 6, and makes the necessary entry there. Then he positions another set of invoice sheets 1 in the normal feeding position behind the rear lower sheet retaining roller 18 but on top of the tail piece 6 of the set 1 on which the typing had just been completed. He then pulls the set 1 on which the typing had been completed in the direction of the arrow A in Figures 5 and 6. He continues this pull, thereby moving said set of invoice sheets 1 from its position shown in Figures 5 and 6 to its position shown in Figures 11 and 12, where the lower edge 36 of the tail piece 6 is clear of the upper sheet retaining rollers 16. At this point, the entire set of invoice sheets 1 on which typing had been completed is now free of the machine. While the set of invoice sheets 1 on which typing had been completed was moving from its position shown in Figures 5 and 6, its tail piece 6 was carrying the succeeding set of invoice sheets 1 from its position in Figures 5 and 6, through those shown in Figures 7, 8, 9, and 10 to that shown in Figures 11 and 12. It is to be noted that although the tail piece 6 of the set of invoice sheets 1 which is being removed exerts no pressure on the platen 15 after its lowermost edge clears the lower front sheet retaining roller 17, nevertheless it has imparted sufficient momentum to the platen 15 to cause said platen and the set of invoice sheets 1 being inserted to move from their positions shown in Figures 9 and 10 to that shown in Figures 11 and 12.

The set of invoice sheets 21 shown in Figures 13, 14, and 17 differs from that shown in Figures 1 to 12 only in the fact that the component sheets have been arranged in a different order. The sheet 22, which is the equivalent of the sheet 4 of the unit 1 has been moved to the top sheet position. The sheet 24, which is the equivalent of the tail piece sheet 5, has been moved from the bottom position to an intermediate position. The sheets 23, which are the equivalents of the sheets 2 and 3 of the set 1, have been moved in the manner shown. The tail piece 25 is the equivalent of the tail piece 6.

The set of invoice sheets 26 shown in Figures 15, 16, and 18 differs from the set 1 in the following particulars:

(1) The component sheets have been re-arranged in order. The sheet 27, which is the equivalent of the tail piece sheet 5, is the top sheet. The sheets 29, which are the equivalents of the sheets 2 and 3, are in the positions shown. The tail piece 28 is the equivalent of the tail piece 6.

(2) There is no equivalent of the sheet 4. All of the sheets, except the tail sheet, are of the same size.

(3) The carbon sheets 7 have been eliminated. Instead the back faces 31 of the sheets 27 and 29 are coated with carbon.

(4) The name of a customer and his code number, jointly designated by the reference numeral 33, have been pre-printed on what is the "first typing line."

(5) A space 32 has been left for the insertion of a store number.

(6) The distance $d-2$ of the "last typing line" to the lowermost edge 30 of the sheets 29 is longer than the distance $d-1$.

The pre-printing of the customer's name and code number is illustrative of one of the many savings possible because of my novel structure. This is particularly advantageous when the customer is a "chain" store. In such event, one would pre-print the name and code number of the customer upon a large number of sets and merely type in the space 33 the number of the particular store in the "chain" to which the goods covered by any one particular invoice are being sent.

The foregoing disclosure is to be understood as being by the way of illustration and not by the way of limitation, since many changes may be made in the structure here disclosed without departing from the spirit of my invention. For this reason it is my desire that the claims which are hereunto appended for the purpose of defining my invention should be limited only by the prior art.

*Definition.*—The term "associated with transfer means" appearing in the claims is to be interpreted as referring to either independent sheets 7 of carbon paper or the equivalent shown in Figures 1, 2, 13, and 14, or to carbon 31 or the equivalent which has been placed on the rear surface of the invoice sheets as shown in Figures 15 and 16.

Having described my invention what I claim as new and useful is:

1. The method of invoicing upon a typing machine having a platen, upper sheet retaining means and lower sheet retaining means which consists in joining together as a unit a plurality of invoice sheets associated with transfer means; appropriately designating a last typing line upon the uppermost of said sheets; providing one of said invoice sheets with a tail piece equal in length to at least the peripheral distance from said upper sheet retaining means of said typing machine to said lower sheet retaining means of said typing machine; inserting said set of sheets in said typing machine; typing upon said set of sheets to said appropriately designated last typing line; inserting a second set of sheets identical in structure with said first set of sheets upon the tail piece of said first set of sheets; and manually pulling said first set of sheets in a forward direction thereby bringing said second set of sheets under said upper sheet retaining means of said typing machine.

2. The method of invoicing upon a typing machine having a platen, upper sheet retaining means, front lower sheet retaining means, and rear lower sheet retaining means which consists in joining together as a unit a plurality of invoice sheets associated with transfer means; appropriately designating a last typing line upon the uppermost of said sheets; providing one of said invoice sheets with a tail piece equal in length to at least the peripheral distance from said upper sheet retaining means of said typing machine to said front lower sheet retaining means of said typing machine; inserting said set of sheets in said typing machine; typing upon said set of sheets to said appropriately designated last typing line; inserting a second set of sheets identical in structure with said first set of sheets upon the tail piece of said first set of sheets; and manually pulling said first set of sheets in a forward direction thereby bringing said second set of sheets under said upper sheet retaining means of said typing machine.

3. The method of invoicing upon a typing machine having a platen, upper sheet retaining means, front lower sheet retaining means, and rear lower sheet retaining means which consists in joining together as a unit a plurailty of invoice sheets associated with transfer means; appropriately designating a last typing line upon the uppermost of said sheets; providing one of said invoice sheets with a tail piece equal in length to substantially the peripheral distance from the upper sheet retaining means of said typing machine to said rear lower sheet retaining means of said typing machine; inserting said set of sheets in said typing machine; typing upon said set of sheets to said last typing line; inserting a second set of sheets identical in structure with said first set of sheets upon the tail piece of the first set of sheets; and manually pulling the first set of sheets in a forward direction thereby bringing the second set of sheets under said upper sheet rteaining means of said typing machine.

4. In a set of invoice sheets comprising a plurality of invoice sheets joined together and associated with transfer means which are to be used as a unit in conjunction with a typing machine having a platen and upper and lower sheet retaining means,—an invoice sheet terminating in a tail piece which is equal in length to at least the peripheral distance from said upper sheet retaining means of said typing machine to said lower sheet retaining means of said typing machine.

5. In a set of invoice sheets comprising a plurality of invoice sheets joined together and associated with transfer means which are to be used as a unit in conjunction with a typing machine having a platen, upper sheet retaining means, front lower sheet retaining means, and rear lower sheet retaining means,—an invoice sheet terminating in a tail piece which is equal in length to at least the peripheral distance from said upper sheet retaining means of said typing machine to said front lower sheet retaining means of said typing machine.

6. In a set of invoice sheets comprising a plurality of invoice sheets joined together and associated with transfer means which are to be used as a unit in conjunction with a typing machine having a platen, upper sheet retaining means, front lower sheet retaining means, and rear lower sheet retaining means,—an invoice sheet terminating in a tail piece which is equal in length to at least the peripheral distance from said upper sheet retaining means of said typing machine to said rear lower sheet retaining means of said typing machine.

7. In a set of invoice sheets comprising a plurality of invoice sheets joined together, associated with transfer means, having thereon an appropriately designated first typing line and another appropriately designated last typing line, and which are to be used as a unit in conjunction with a typewriter having a platen, upper sheet retaining means and lower sheet retaining means,— an invoice sheet terminating in a tail piece equal in length to at least the distance from said appropriately designated last typing line of said set of invoice sheets to said lower sheet retaining means of said typewriter plus the distance from the upper edge of said set of invoice sheets to said appropriately designated first typing line of said set of invoice sheets.

8. In a set of invoice sheets comprising a plurality of invoice sheets joined together, associated with transfer means, having thereon an appropriately designated first typing line and another appropriately designated last typing line, and which are to be used as a unit in conjunction with a typewriter having a platen, upper sheet retaining means, front lower sheet retaining means, and rear lower sheet retaining means,—an invoice sheet terminating in a tail piece equal in length to at least the distance from said appropriately designated last typing line of said set of invoice sheets to said front lower sheet retaining means of said typewriter plus the distance from the upper edge of said set of invoice sheets to said appropriately designated first typing line of said set of invoice sheets.

9. In a set of invoice sheets comprising a plurality of invoice sheets joined together, associated with transfer means, having thereon an appropriately designated first typing line and another appropriately designated last typing line, and which are to be used as a unit in conjunction with a typewriter having a platen, upper sheet retaining means, front lower sheet retaining means, and rear lower sheet retaining means,—an invoice sheet terminating in a tail piece equal in length to at least the distance from said appropriately designated last typing line of said set of invoice sheets to said rear lower sheet retaining means of said typewriter plus the distance from the upper edge of said set of invoice sheets to said appropriately designated first typing line of said set of invoice sheets.

10. The method of invoicing upon a typing machine having a platen, upper sheet retaining means and lower sheet retaining means which consists in joining together as a unit a plurality of invoice sheets associated with transfer means; appropriately designating a first and last typing line upon the uppermost of said sheets; providing one of said invoice sheets with a tail piece equal in length to at least the peripheral distance from said appropriately designated last typing line to said lower sheet retaining means of said typing machine plus the distance from the upper edge of said set of invoice sheets to said appropriately designated first typing line; inserting said set of sheets in said typing machine; typing upon said set of sheets to said appropriately designated last typing line; inserting a second set of sheets identical in structure with said first set of sheets upon the tail piece of said first set of sheets; and manually pulling said first set of sheets in a forward direction thereby bringing said second set of sheets under said upper sheet retaining means of said typing machine.

11. The method of invoicing upon a typing machine having a platen, upper sheet retaining means, front lower sheet retaining means, and rear lower sheet retaining means which consists in joining together as a unit a plurality of invoice sheets associated with transfer means; appropriately designating a first and last typing line upon the uppermost of said sheets; providing one of said invoice sheets with a tail piece equal in length to at least the peripheral distance from said appropriately designated last typing line to said front lower sheet retaining means of said typing machine plus the distance from the upper edge of said set of invoice sheets to said appropriately designated first typing line; inserting said set of sheets in said typing machine; typing upon said set of sheets to said appropriately designated last typing line; inserting a second set of sheets identical in structure with said first set of sheets upon the tail piece of said first set of sheets; and manually pulling said first set of sheets in a forward dirrection thereby bringing said second set of sheets under said upper sheet retaining means of said typing machine.

12. The method of invoicing upon a typing machine having a platen, upper sheet retaining means, front lower sheet retaining means, and rear lower sheet retaining means which consists in joining together as a unit a plurality of invoice sheets associated with transfer means; appropriately designating a first and last typing line upon the uppermost of said sheets; providing one of said invoice sheets with a tail piece equal in length to at least the peripheral distance from said appropriately designated last typing line to said rear lower sheet retaining means of said typing machine plus the distance from the upper edge of said set of invoice sheets to said appropriately designated first typing line; inserting said set of sheets in said typing machine; typing upon said set of sheets to said appropriately designated last typing line; inserting a second set of sheets identical in structure with said first set of sheets upon the tail piece of said first set of sheets; and manually pulling said first set of sheets in a forward direction thereby bringing said second set of sheets under said upper sheet retaining means of said typing machine.

EDWARD JACOBS.